US011024948B2

(12) United States Patent
Ganeshan et al.

(10) Patent No.: US 11,024,948 B2
(45) Date of Patent: Jun. 1, 2021

(54) USER DEVICE HAVING HALF SLOT ANTENNA

(71) Applicant: MOTOROLA MOBILITY LLC, Chicago, IL (US)

(72) Inventors: Prem K. Ganeshan, Arlington Heights, IL (US); Md Rashidul Islam, Lombard, IL (US); Umesh D. Navsariwala, Bartlett, IL (US)

(73) Assignee: Motorola Mobility LLC, Chicago, IL (US)

( * ) Notice: Subject to any disclaimer, the term of this patent is extended or adjusted under 35 U.S.C. 154(b) by 203 days.

(21) Appl. No.: 15/843,571

(22) Filed: Dec. 15, 2017

(65) Prior Publication Data

US 2019/0190126 A1 Jun. 20, 2019

(51) Int. Cl.
*H01Q 13/10* (2006.01)
*H01Q 1/24* (2006.01)
*H01Q 21/06* (2006.01)
*H04M 1/02* (2006.01)
*H01Q 21/28* (2006.01)
*H01Q 5/307* (2015.01)

(52) U.S. Cl.
CPC .............. *H01Q 1/245* (2013.01); *H01Q 1/243* (2013.01); *H01Q 13/10* (2013.01); *H01Q 21/064* (2013.01); *H01Q 21/28* (2013.01); *H04M 1/026* (2013.01); *H01Q 5/307* (2015.01); *H04M 1/0202* (2013.01); *H04M 1/0283* (2013.01)

(58) Field of Classification Search
CPC ........ H01Q 1/245; H01Q 21/28; H01Q 13/10; H01Q 1/243; H01Q 21/064; H01Q 5/307; H04M 1/026; H04M 1/0202; H04M 1/0283
See application file for complete search history.

(56) References Cited

U.S. PATENT DOCUMENTS

| 8,483,751 | B2* | 7/2013 | Black | H01Q 1/243 343/702 |
| 8,531,337 | B2* | 9/2013 | Soler Castany | H01Q 1/242 343/702 |
| 8,907,853 | B2* | 12/2014 | Ying | H01Q 1/243 343/702 |
| 8,957,814 | B2* | 2/2015 | Eom | H01Q 1/243 343/702 |
| 2008/0316117 | A1* | 12/2008 | Hill | H01Q 1/243 343/702 |
| 2009/0256758 | A1* | 10/2009 | Schlub | H01Q 1/243 343/702 |

(Continued)

OTHER PUBLICATIONS

Sharawi, Mohammad S., et al., A Two Concentric Slot Loop Based Connected Array MIMO Antenna System for 4G/5G Terminals, DOI 10.1109/TAP.2017.2671028, 2016 IEEE.

(Continued)

*Primary Examiner* — Trinh V Dinh
(74) *Attorney, Agent, or Firm* — Isidore PLLC (57) ABSTRACT

A user device includes an enclosure having an interior mounting surface for receiving one or more functional components. An antenna assembly has an electrical interface connectable to at least one of the one or more functional components. The antenna assembly includes a first half slot antenna angularly formed along both inner perimeter sides of a first corner of the enclosure.

20 Claims, 9 Drawing Sheets (56) References Cited

U.S. PATENT DOCUMENTS

| | | | | |
|---|---|---|---|---|
| 2010/0304785 | A1* | 12/2010 | Marlett | H01Q 1/243 455/552.1 |
| 2012/0032863 | A1* | 2/2012 | Lai | H01Q 1/243 343/767 |
| 2013/0127673 | A1* | 5/2013 | Chang | H01Q 21/28 343/702 |
| 2015/0147984 | A1* | 5/2015 | Ying | H04B 1/3827 455/90.3 |
| 2015/0372372 | A1* | 12/2015 | Lee | H01Q 1/243 343/702 |
| 2016/0301139 | A1* | 10/2016 | Lombardi | H01Q 1/243 |
| 2018/0198492 | A1* | 7/2018 | Zhao | H04M 1/026 |
| 2019/0181553 | A1* | 6/2019 | Lee | H01Q 9/42 |

OTHER PUBLICATIONS

Qu, Longyue, et al., "MIMO antennas using controlled orthogonal characteristic modes by metal rims", The Institution of Engineering and Technology, Research Article, Nov. 14, 2016.

Saraereh, Omar A., et al., "Low Correlation Multiple Antenna System for Mobile Phone Applications Using Novel Decoupling Slots in Ground Plane", 2013 Loughborough Antennas & Propagation Conference, Nov. 11-12, 2013, Loughborough, UK.

Stanley, Manoj, et al., A Novel Reconfigurable Metal Rim Integrated Open Slot Antenna for Octa-Band Smartphone Applications, IEEE Transactions on Antennas and Propagation, vol. 65, No. 7, Jul. 2017.

* cited by examiner

USER DEVICE HAVING HALF SLOT ANTENNA

TECHNICAL FIELD

The present disclosure generally relates to antennas for mobile radio user devices and more particularly to integrating longer wavelength antennas into a chassis of the user device.

BACKGROUND

Handheld radio devices such as cellular (or mobile) phones, including "smart" phones, have become commonplace and are used by large segments of the population in developed regions of the world. The preferred shape and form factors of these devices have changed over the years. Various form factors and features, both aesthetic and functional, have been tried with varying degrees of acceptance among consumers. One aspect of handheld radio device design that has become a convention is the lack of an obvious antenna. Early devices used large, screw-in antennas similar to those used on public safety two-way radios. Retractable antennas then became common. Presently, very few cellular phones have a noticeable antenna. Some devices use an entirely internal antenna, while others have used external elements that are styled to provide an aesthetic feature of the device in addition to operating as an antenna.

Among design challenges associated with each of these antenna designs is the loading effect of the human body, and in particular how the user of the device holds and positions the device when talking. Depending on the design and how a user holds the device, and in particular where the user's skin makes contact with the device, the radiated efficiency of the antenna can change significantly. Adding to such design constraints, consumers exhibit a strong preference for a metal back phone over a plastic counterpart because of a premium feel of metal phones. Designing an antenna system for a metal back phone is a challenging task. Metallic parts can shield out areas for transmission and reception, significantly reducing antenna performances.

BRIEF DESCRIPTION OF THE DRAWINGS

The description of the illustrative embodiments is to be read in conjunction with the accompanying drawings. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present innovation, a user device includes an enclosure having an interior mounting surface for receiving one or more functional components. An antenna assembly has an electrical interface connectable to at least one of the one or more functional components. The antenna assembly includes a first half slot antenna angularly formed along both inner perimeter sides of a first corner of the enclosure. In an exemplary embodiment, the first half slot antenna is at least a part of a race track antenna system for cellular frequencies.

In one or more aspects of the present disclosure, a user device includes one or more functional components. A user device chassis includes an enclosure having an interior mounting surface for receiving the one or more functional components. The enclosure includes an exterior band. The enclosure includes a frame having a front interior mounting surface for receiving one or more functional components. A back panel mounting surface receives an exterior back panel. A bezel mounting surface surrounds a perimeter of the back panel mounting surface. A perimeter mounting surface attached to an exterior band encloses respective side edges of the front exterior surface and the bezel mounting surface to form a generally rectangular cuboid shape having a plurality of corners. An antenna assembly has an electrical interface connectable to the one or more functional components. The antenna assembly includes a first half slot antenna angularly formed along both inner perimeter sides of a first corner of the enclosure in the bezel mounting surface, proximate to the exterior band. A nonconductive exterior bezel is attached to the bezel mounting surface of the frame, forming a bezel portion of a back exterior surface and hiding the antenna assembly.

In one or more aspects of the present disclosure, a method includes angularly forming a first half slot antenna along both inner perimeter sides of a first corner of an enclosure for a mobile user device. The method includes attaching one or more functional components to an interior mounting surface of the enclosure. The method includes electrically connecting the first half slot antenna to at least one of the one or more functional components to provide signal communication.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within an electronic device are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

Figure 1:
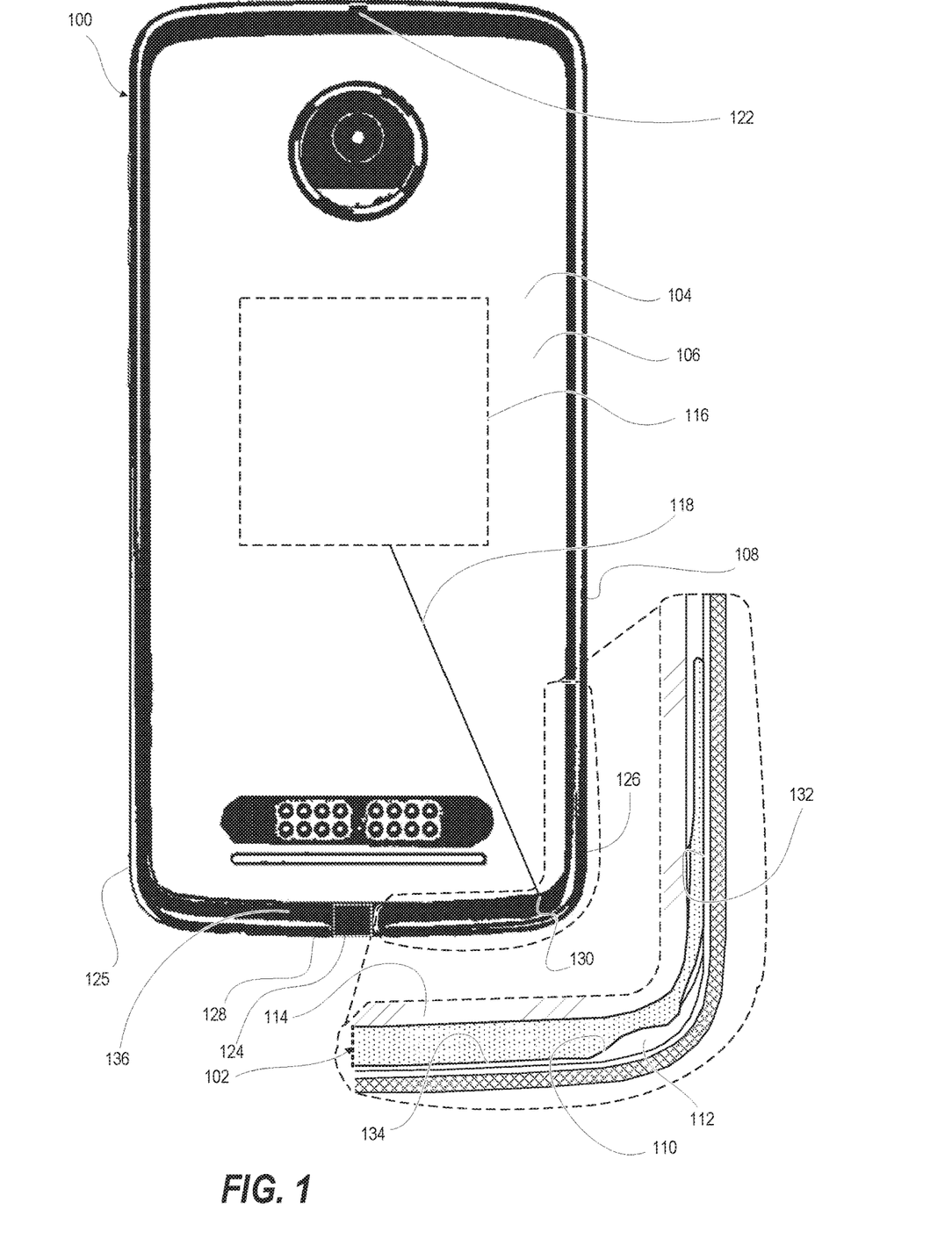
FIG. 1 illustrates a rear view of a user device having a detail cutaway internal view of a half slot antenna of an antenna system, according to one or more embodiments.

FIG. 1 illustrates an example electronic device, and specifically user device 100, within which several of the features of the disclosure can be implemented including a mechanically integrated aperture tuning bridge for race track antenna system. User device 100 can be one of a host of different types of devices, including but not limited to, a mobile cellular phone or smart-phone, a laptop, a net-book, an ultra-book, and/or a tablet computing device. User device 100 may be portable or fixed.

In one or more embodiments consistent with the present innovation, user device 100 includes an antenna system 102 that resembles a "race track" formed around a metal exterior back panel 104 of user device 100, which enables an enclosure 108 of the user device 100 to include an almost full metal back surface 106. The metal exterior back panel 104 is a substantial portion of the back surface 106. The antenna system 102 includes a first half slot antenna 110 (also referred to as "first antenna" and "first half-slot antenna"). A user device chassis 112 provides at least a portion of the enclosure 108 for the user device 100. An interior mounting surface 114 of the user device chassis 112 receives one or more functional components 116 (shown in phantom). Examples of functional components 116 include a printed circuit board (PCB) with integrated circuits and solid state memory components, power supplies, batteries, displays, audio input and output devices, cameras, etc. User device 100 includes the hardware and software to support various wireless or wired communication functions using the antenna system 102. The antenna system 102 has an electrical interface (i.e., a feed line) 118 connectable to at least one of the one or more functional components 116.

One consideration taken with the present disclosure is that certain limitations in placement of functional components 116 can limit areas of the antenna system 102, which in turn limits an ability for a length of an antenna to be an appropriate fraction of a wavelength of an intended communication band. For example, users tend to hold the user device 100 such that most of the long lateral sides of antenna system 102 can tend to be unusable or degraded. The shorter top and bottom portions of the enclosure 108 can have interface devices that limit available length of an antenna. In an exemplary embodiment, a top speaker 122 and a bottom device interface 124, such as a universal serial bus (USB) port, interrupt a metal exterior band 125. To enable successful communication in longer wavelength frequency bands, the first half slot antenna 110 of the antenna system 102 is angularly formed along both inner perimeter sides 126, 128 of a first corner 130 of the enclosure 108. Conventionally, bands having carrier frequencies below about 800 MHz are referred to as ultralow bands (LB). Bands between 800 MHz and 1500 MHz are often referred to as low bands (LB).

Bands between 1500 MHz and 2200 MHz are often referred to as mid bands (MB), and bands greater than 2200 MHz are often referred to as high bands (HB). As one embodiment, along the right perimeter side 126, a first portion 132 of the half slot antenna 110 can be sized for ULB and/or a LB. Along the bottom perimeter side 128, a second portion 134 of the half slot antenna 110 can be sized for a HB or a MB. The antenna system 102 is covered by a nonconductive bezel 136.

The present disclosure provides, in part, a half slot antenna that departs in shape from a basic slot antenna. These variations in shape are contrasted as follows with the basic slot antenna having a rectangular opening. A basic slot antenna consists of a radiator formed by cutting a narrow slot in a large metal surface. The slot length is a half wavelength at the desired frequency and the width is a small fraction of a wavelength. The antenna is frequently compared to a conventional half-wave dipole consisting of two flat metal strips. The physical dimensions of the metal strips are such that they would just fit into the slot cut out of the large metal sheet. This type of antenna is called the complementary dipole. The slot antenna can be compared to its complementary dipole to illustrate that the radiation patterns produced by a slot antenna cut into an infinitely large metal sheet and that of the complementary dipole antenna are the same. Several important differences exist between the slot antenna and its complementary antenna. First, the electric and magnetic fields are interchanged. In the case of the dipole antenna, the electric lines are horizontal while the magnetic lines form loops in the vertical plane. With the slot antenna, the magnetic lines are horizontal and the electric lines are vertical. The electric lines are built up across the narrow dimensions of the slot. As a result, the polarization of the radiation produced by a horizontal slot is vertical. If a vertical slot is used, the polarization is horizontal. A second difference between the slot antenna and its complementary dipole is that the direction of the lines of electric and magnetic force abruptly reverse from one side of the metal sheet to the other. In the case of the dipole, the electric lines have the same general direction while the magnetic lines form continuous closed loops. When energy is applied to the slot antenna, currents flow in the metal sheet. These currents are not confined to the edges of the slot but rather spread out over the sheet. Radiation then takes place from both sides of the sheet. In the case of the complementary dipole, however, the currents are more confined. A much greater magnitude of current is required to produce a given power output using the dipole antenna.

Figure 2:
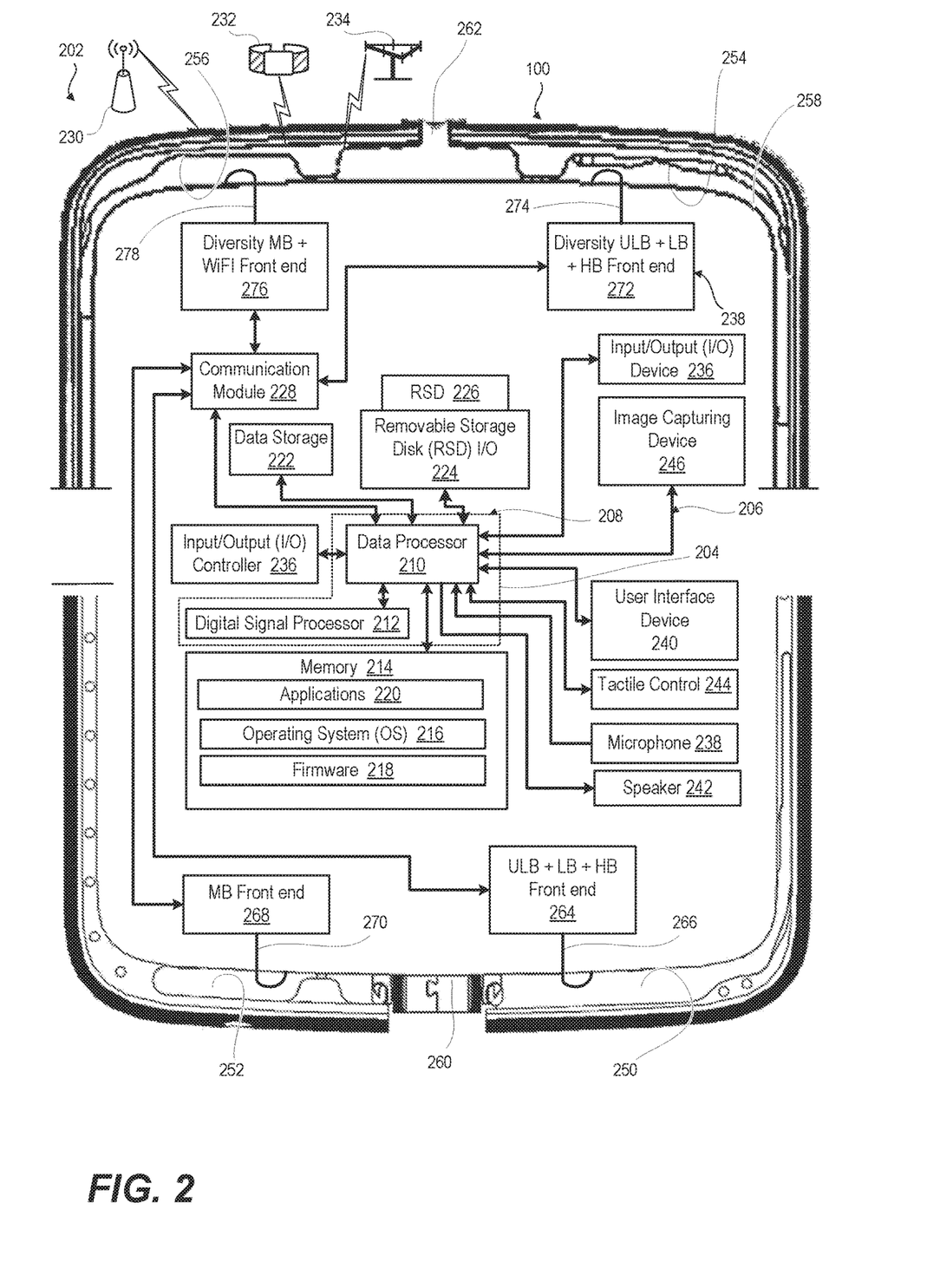
FIG. 2 illustrates a simplified block diagram of an electronic user device having an antenna system with which certain aspects of the disclosure can be practiced, in accordance with one or more embodiments.

Turning now to FIG. 2, there is depicted a block diagram representation of an example electronic device, and specifically user device 100, within which several of the features of the disclosure can be implemented. In an exemplary aspect, user device 100 includes the hardware and software to support various wireless or wired communication functions as part of a communication system 202. Referring now to the specific component makeup and the associated functionality of the presented components, processor subsystem 204 can be an integrated circuit (IC) that connects, via a plurality of bus interconnects 206, to a plurality of functional components 208 of user device 100. Processor subsystem 204 can include one or more programmable microprocessors, such as data processor 210 and digital signal processor (DSP) 212, which may both be integrated into a single processing device, in some embodiments. Processor subsystem 204 controls the communication, user interface, and other functions and/or operations of user device 100. These functions and/or operations thus include, but are not limited to, application data processing and signal processing. The user device 100 may use hardware component equivalents such as special purpose hardware, dedicated processors, general purpose computers, microprocessor-based computers, micro-controllers, optical computers, analog computers, dedicated processors and/or dedicated hard wired logic. Connected to processor subsystem 204 is memory 214, which can include volatile memory and/or non-volatile memory. Memory 214 stores software, such as operating system 216, as well as firmware 218. One or more other executable applications 220 can be stored within memory 214 for execution by processor subsystem 204. Memory 214 may be augmented by on-device data storage 222. Memory 214 can be further augmented by removable storage device (RSD) input/output (I/O) interface 224 that receives a RSD 226.

According to the illustrative embodiment, user device 100 supports wireless communication via a communication module 228. For example, user device 100 may support communication protocols and transceiver radio frequencies appropriate for a wireless local area network (WLAN), represented by a node 230. The user device 100 can communicate over a personal access network (PAN) with devices such as a smart watch 232. The user device 100 can communicate with a radio access network (RAN) 234 that is part of a wireless wide area network (WWAN). In certain embodiments, user device 100 may also support a hardwired local access network (LAN) or peripheral devices via an input/output (I/O) controller 236.

User device 100 includes input and output devices. For example, microphone 248 receives user audible inputs. User interface device 240 can present visual or tactile outputs as well as receive user inputs. In one example, user interface device 240 can include a touch screen that is embedded within or associated with a display. An audio speaker 242 can augment or provide alternate presentation of the visual or tactile outputs of user interface device 240. A tactile control 244 can provide an interface such as for braille reading or manual inputs. An image capturing device 246 can receive gestures and other image data.

In an exemplary embodiment, the antenna system 238 can include four (4) internal loop antennas 250, 252, 254, 256 arranged in continuous race track shaped region 258 externally with two breaks at a bottom universal serial bus (USB) device interface 260 and a top speaker 262. The race track shaped region 258 is grounded at selective locations so that the antenna length is suitable for optimum performances. Main antennas 250, 252 are disposed on the bottom two corners of the user device 100. Diversity antennas 254, 256 are disposed at the top two corners of the user device 100. A front end 264 for ultra-low (ULB), low band (LB), and high band (HB) communication drives antenna 250 via a feed line 266. A front end 268 for mid band (MB) communication drives antenna 252 via a feed line 270. A front end 272 for diversity ULB, LB and HB drives antenna 254 via a feed line 274. A front end 276 for diversity MB and Wi-Fi drives antenna 256 via a feed line 278.

Figure 3:
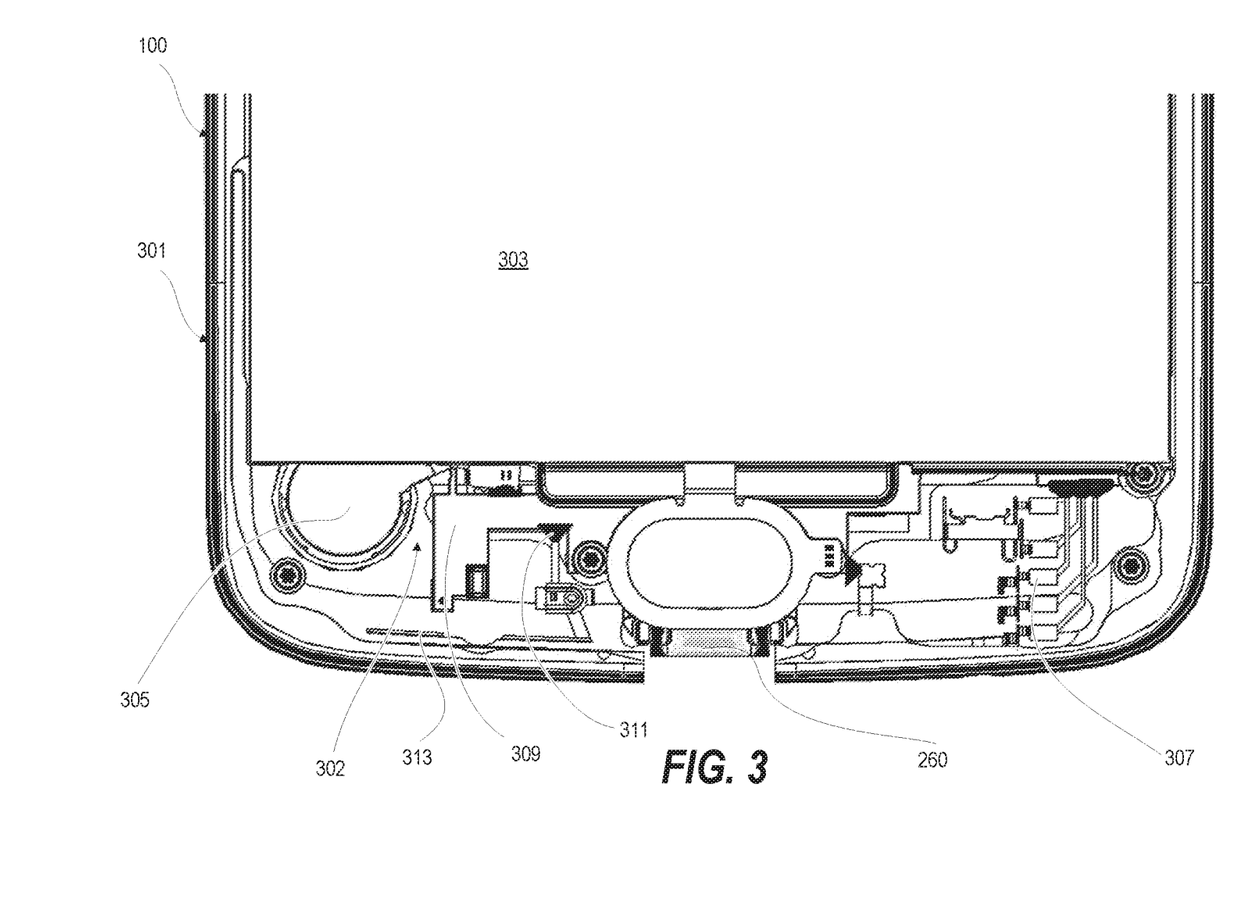
FIG. 3 illustrates a detail front side view of a partially disassembled user device, according to one or more embodiments.

In an exemplary embodiment, FIG. 3 illustrates the user device 100 from a front side 301 with functional components 302 exposed, which include an indium-tin-oxide (ITO) display 303, a vibrator 305, a headset jack (HSJ) 307, and USB device interface 260. A printed circuit board (PCB) 309 is connected to a PCB ground 311 whose end provides a hidden conductor 313.

Figure 4:
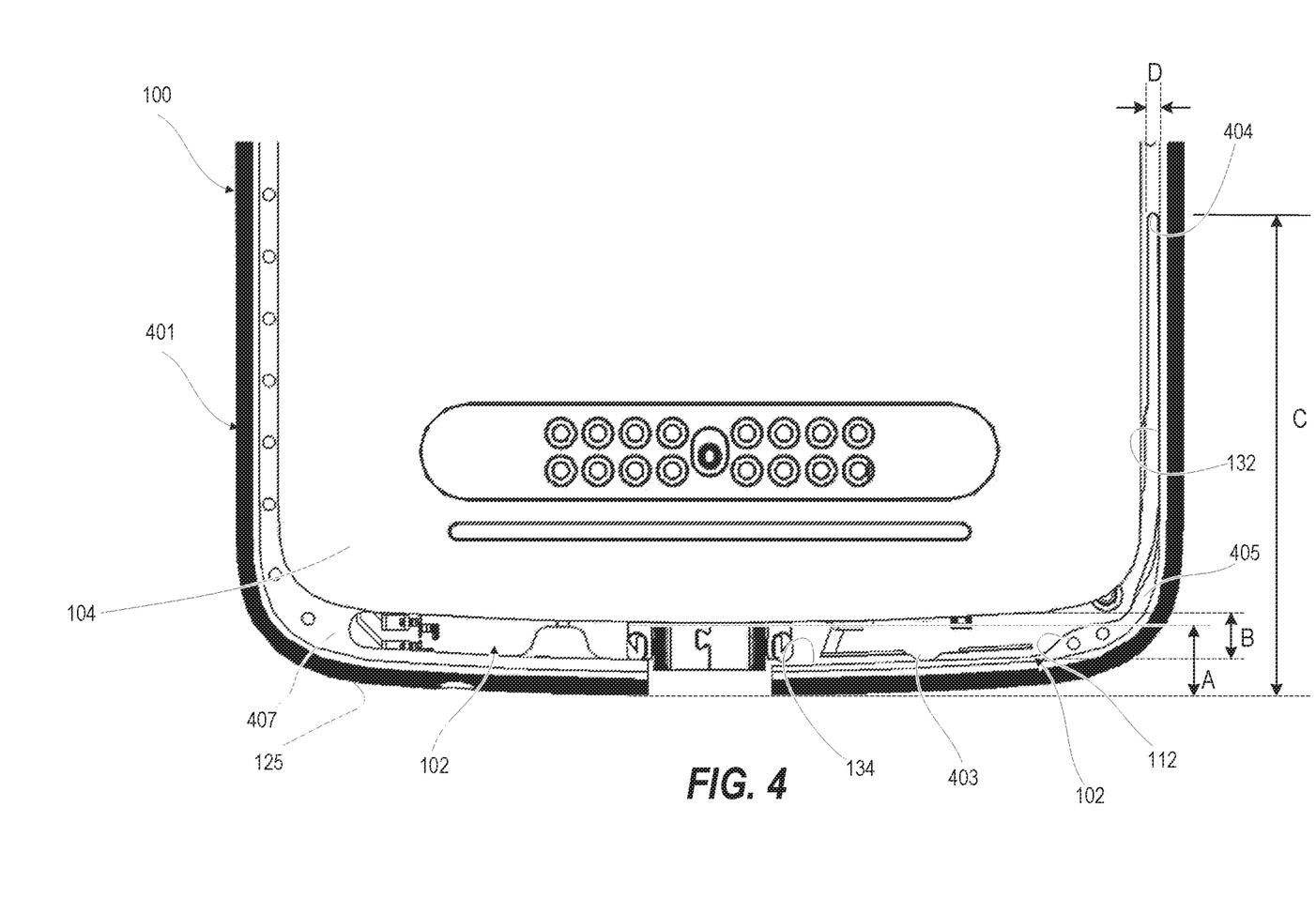
FIG. 4 illustrates a detail backside view of a partially disassembled user device, according to one or more embodiments.

FIG. 4 illustrates the user device 100 from a back side 401. A ground coupler 403 is provided between a midpoint of the PCB ground 311 and the metal exterior band 125. The ground coupler 403 does not contact the antenna system 102. In an exemplary embodiment, the gap is 0.7 mm, although other distances can be used. The metal exterior back panel 104 forms a conductive metal portion of the half slot antenna 110. A bottom edge of the metal exterior back panel 104 is spaced away from a bottom side of user device 100 by a distance "A" such as 5.8 mm. The second portion 134 of the first half-slot antenna 110 is longitudinally sized for HB frequency and has a transverse width "B" in an exemplary embodiment of 3.55 mm. The first portion 132 has a longitudinal length "C", which in an exemplary embodiment is 38 mm. The second portion 134 has a transverse width "D", which in the exemplary embodiment is 1.2 mm. The first half slot antenna 110 has a narrower transverse width D of first portion 132 proximate to one shorting end 404 than a wider transverse width B of the second portion 134. The relatively narrower transverse width D introduces a slot mode to the first portion 132 that improves a low band standing wave ratio. Exposed portions of a frame 405 of the user device 100 between the metal exterior back panel 104 and the metal exterior band 125 provide a bezel mounting surface 407 for mounting the nonconductive bezel 136 (FIG. 1) to hide the antenna system 102.

Figure 5:
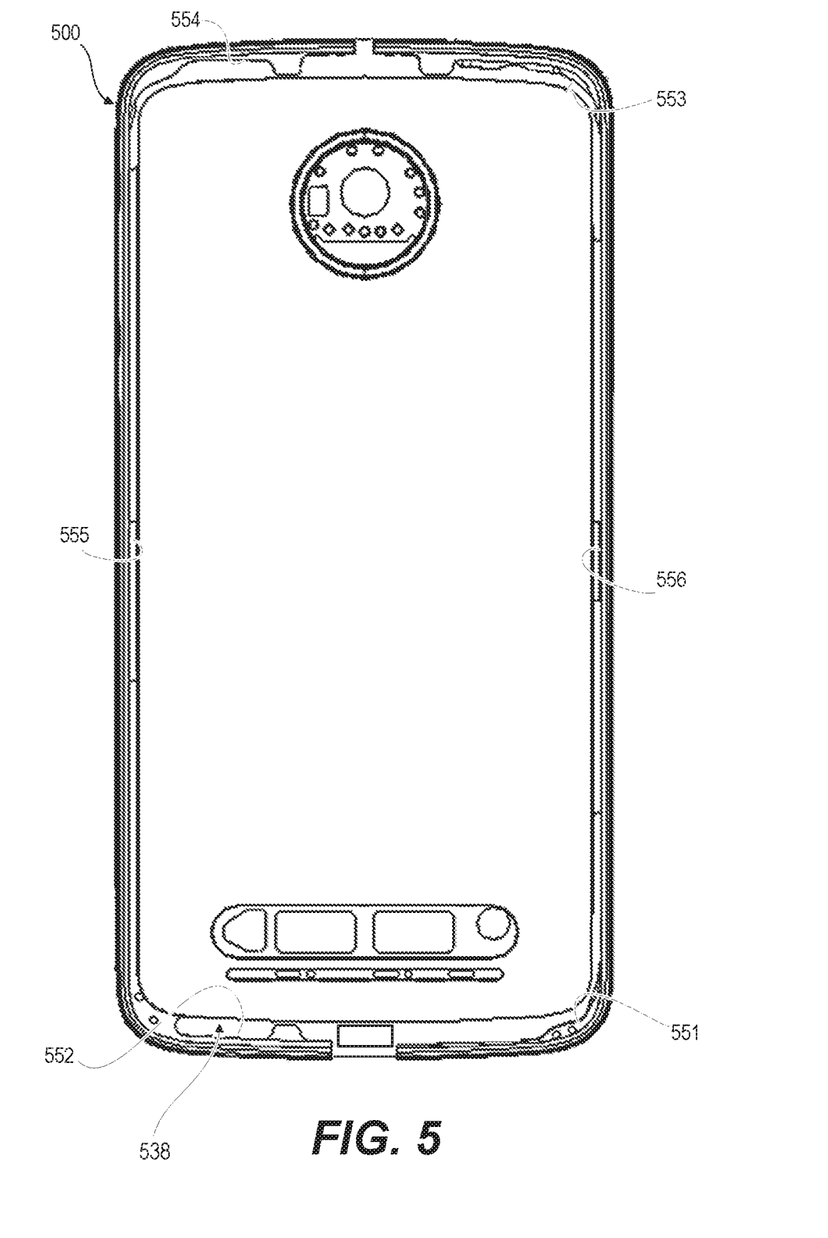
FIG. 5 illustrates a back side view of an example user device that is partially disassembled to expose a six antenna system, according to one or more embodiments.

In one or more embodiments, FIG. 5 illustrates an example user device 500 having an antenna system 538 with six (6) internal loop antennas 551-556 are arranged in as a continuous race track region 558. First antenna 551 is a main antenna disposed on the bottom right corner of the user device 500. The first antenna 551 can be configured for ULB, LB and MB. A second antenna 552 is a main antenna disposed on a bottom left edge of the user device 500. Second antenna 552 can be configured for HB. A third antenna 553 is a diversity antenna disposed on a top right edge of the user device 500. Third antenna 553 can be configured for diversity ULB, LB and MB. A fourth antenna 554 is a diversity antenna disposed on a top left edge of the user device 500. Fourth antenna 554 can be configured for diversity HB and Wi-Fi. Thus, example user device 500 has swapped positioning of functionality of HB and MB as compared to user device 100 (FIG. 2). Fifth antenna 555 is formed as a slot antenna along a midpoint of a left side, as viewed in FIG. 5. The sixth antenna 556 is formed as a slot antenna along a midpoint of a right side.

Figure 6:
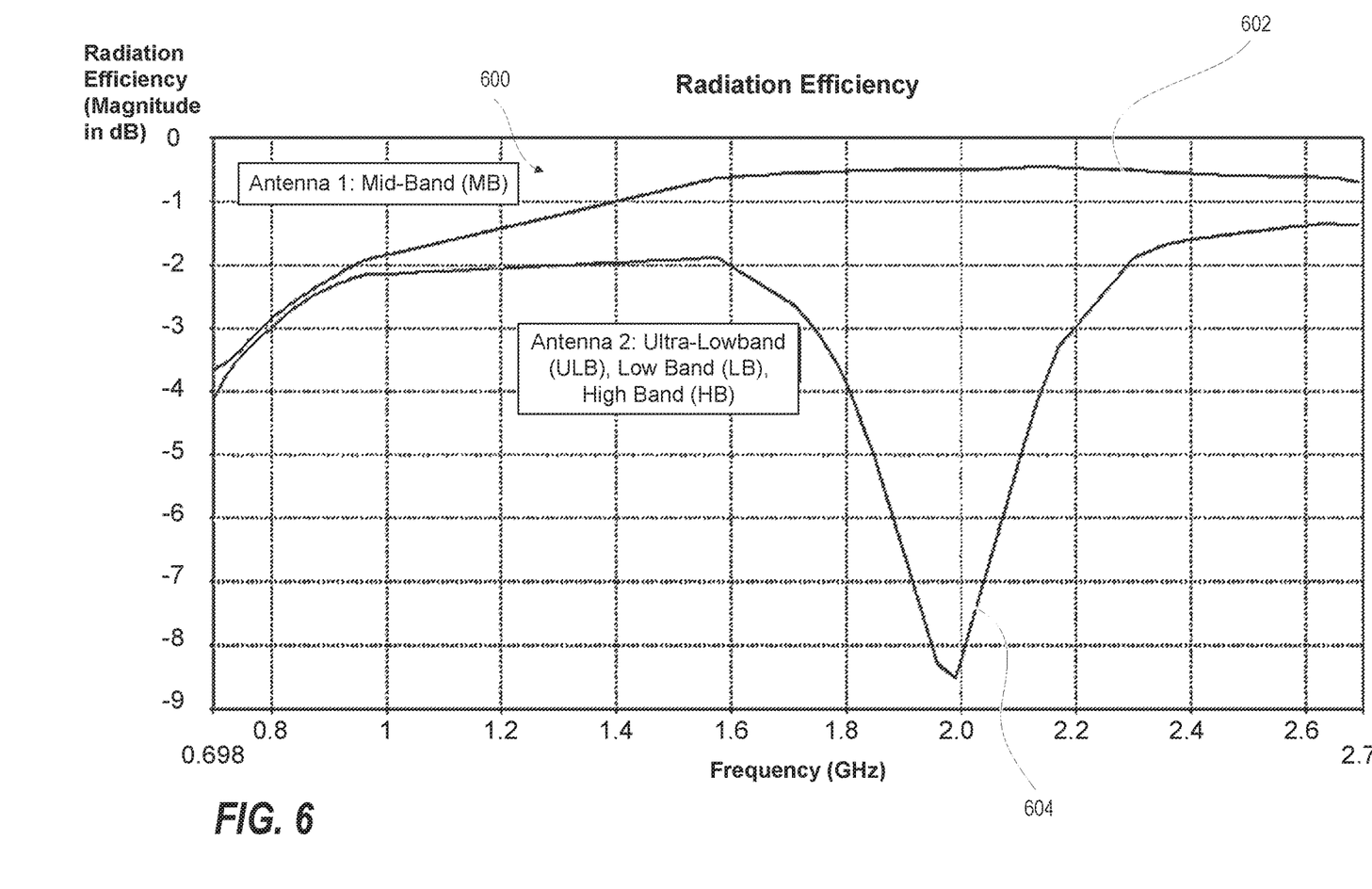
FIG. 6 illustrates a graphical plot of antenna efficiency of a mid-band (MB) antenna and an ultra-low band (ULB)/low band (LB) antenna, according to one or more embodiments.
Figure 7:
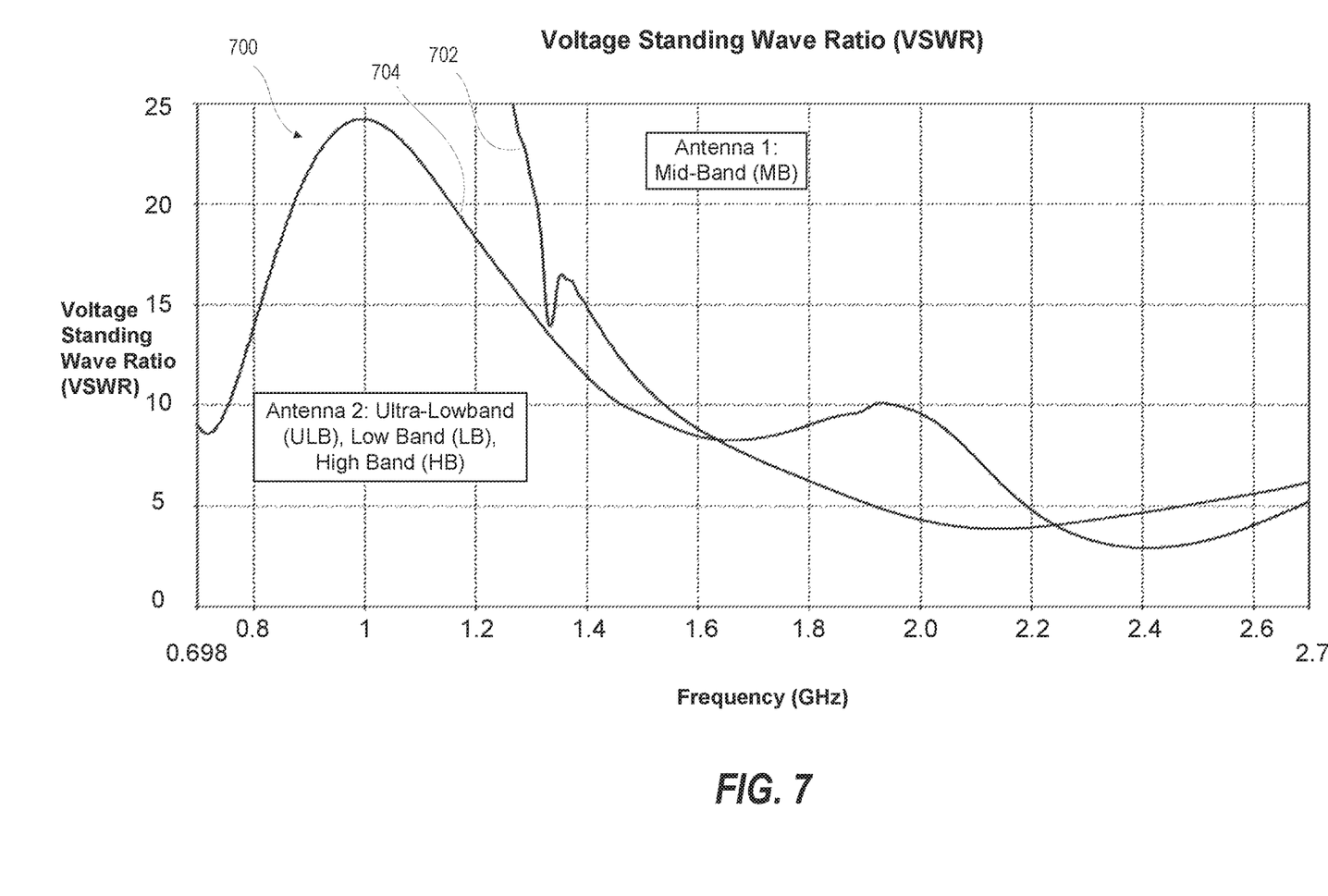
FIG. 7 illustrates a graphical plot of voltage standing wave ratio (VSWR) of the MB antenna and the ULB/LB antenna, according to one or more embodiments.

FIGS. 6-7 provide graphical plots 600, 700 that are both analyzed to show efficient antenna performance is achieved with the first antenna 250 (FIG. 2) assigned to ULB, LB and HB and the second antenna 252 (FIG. 2) assigned to MB. FIG. 6 illustrates one aspect of antenna efficiency, namely radiation efficiency. FIG. 7 illustrates another aspect of antenna efficiency, namely voltage standing wave ratio (VSWR). FIG. 6 illustrates a graphical plot 600 of an antenna system 238 (FIG. 2) including MB antenna trace 602 and ULB/LB antenna trace 604 for radiation efficiency as a function of frequency. A low efficiency ("lossy") portion around 1.2 GHz of the ULB/LB antenna trace 604 is selected for a region that is not used. Generally, the MB antenna trace 602 has greater radiation efficiency for the frequencies plotted as compared to the ULB/LB antenna trace 604, especially as compared to the lossy portion. On this one measure of efficiency, MB antenna trace 602 appears to be a good choice relative to the ULB/LB antenna trace 604 for the full spectrum.

FIG. 7 illustrates a graphical plot 700 of performance of the antenna system 238 (FIG. 2) including MB antenna trace 702 and ULB/LB antenna trace 704 for VSWR as a function of frequency. For a radio (transmitter or receiver) to deliver power to an antenna, the impedance of the radio and transmission line must be well matched to the antenna's impedance. The parameter VSWR is a measure that numerically describes how well the antenna is impedance matched to the radio or to the transmission line that the antenna is connected to. VSWR is a function of the reflection coefficient, which describes the power reflected from the antenna. The VSWR is always a real and positive number for antennas. The smaller the VSWR is, the better the antenna is matched to the transmission line and the more power is delivered to the antenna. The minimum VSWR is 1.0. In this case, no power is reflected from the antenna, which is ideal. MB antenna trace 702 is closest to ideal at 2.1 GHz with a VSR of about 4. The rest of the MB antenna trace 702 is higher than 4 and farther from the ideal. ULB/LB antenna trace 704 is closest to ideal at 2.4 GHz with a VSR of about 3. The rest of the ULB/LB antenna trace 704 is higher than 3 and farther from the ideal. In a low frequency region below 1.2 GHz, the ULB/LB antenna trace 704 has a lower VSWR than the MB antenna trace 702 and thus provides better performance. Thus, the appearance in FIG. 6 that the MB antenna trace 602 is efficient in this region is shown to only be one measure of antenna performance.

Figure 8A:
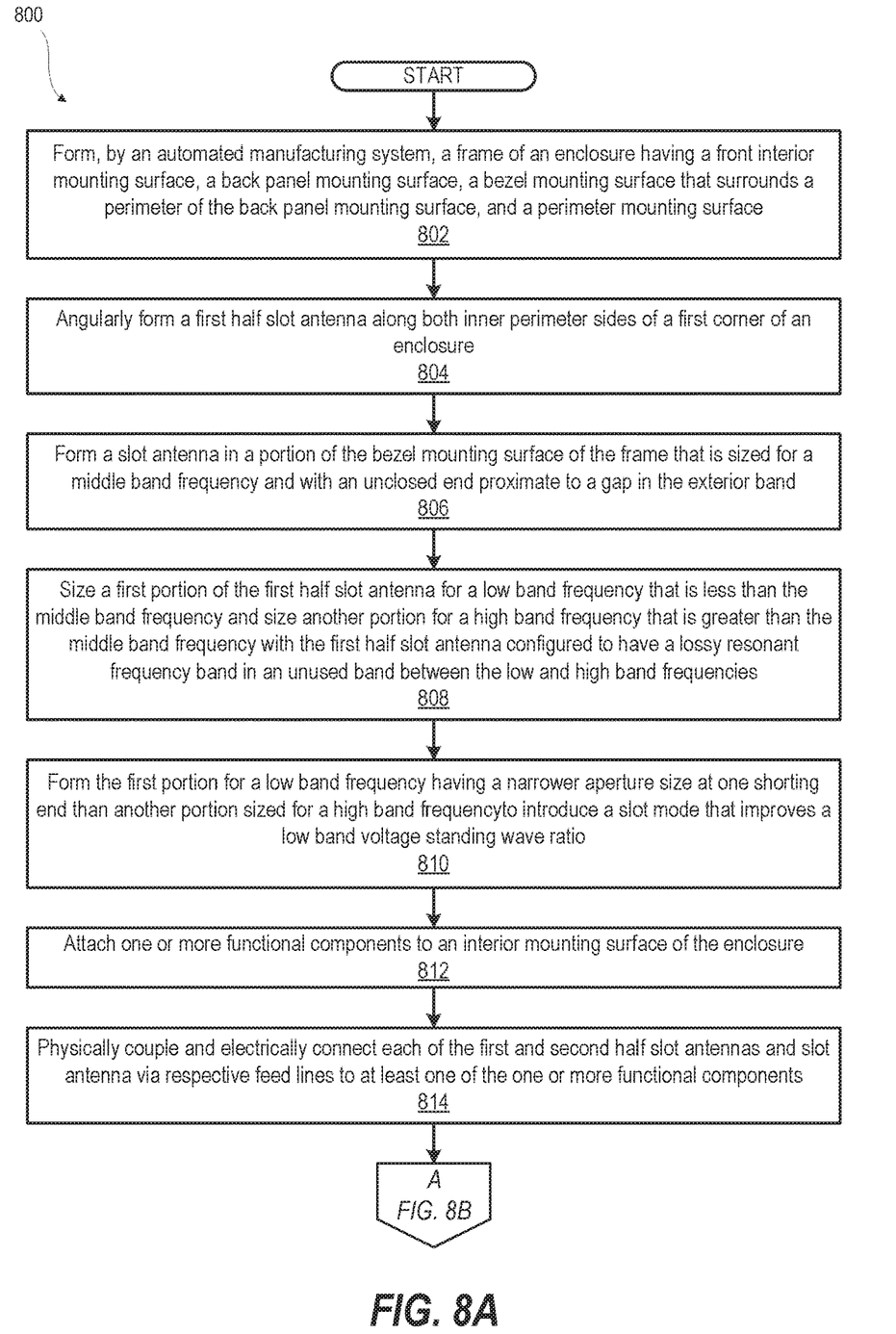
FIGS. 8A-8B illustrate a method of making a user device having a half slot antenna, according to one or more embodiments.
Figure 8B:
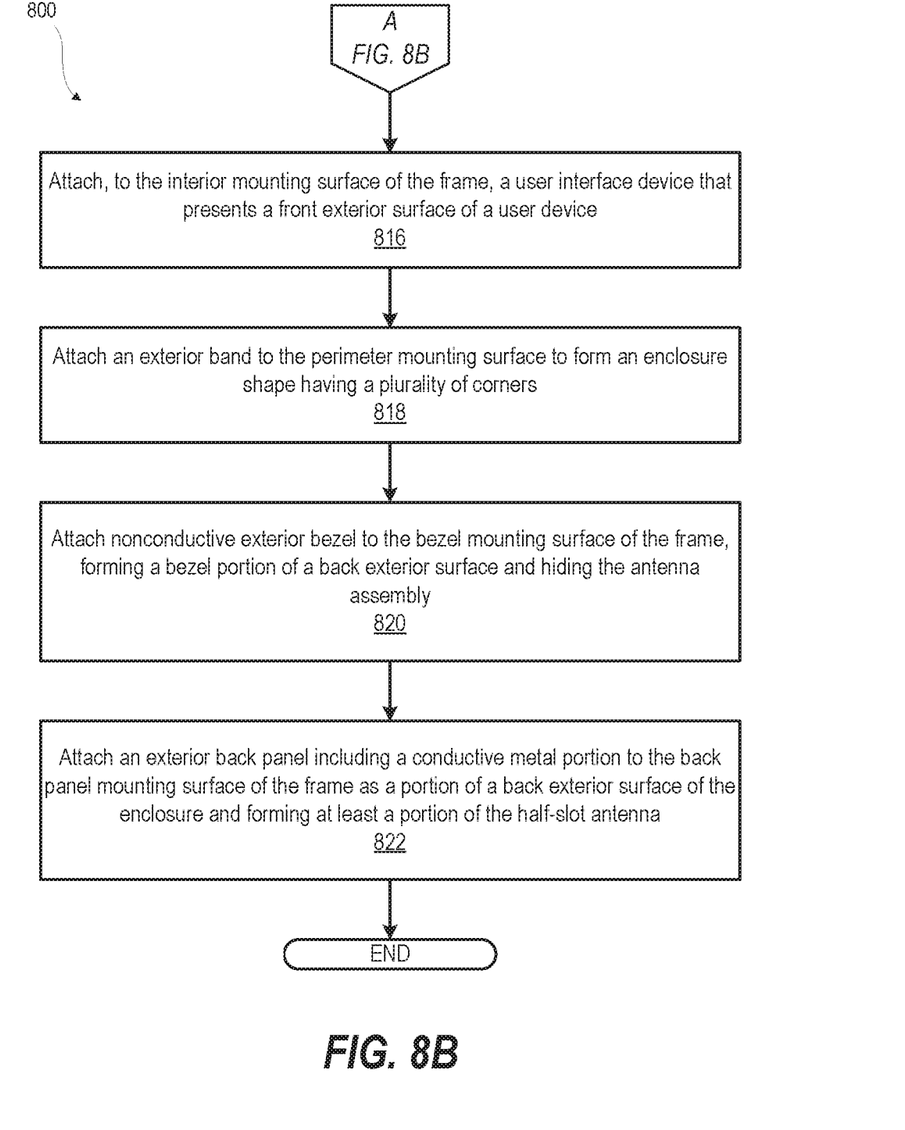

FIGS. 8A-8B illustrate a method 800 for making an antenna assembly in a user device chassis of a user device. In one or more embodiments, method 800 begins forming, by an automated manufacturing system, a frame of an enclosure having a front interior mounting surface, a back panel mounting surface, a bezel mounting surface that surrounds a perimeter of the back panel mounting surface, and a perimeter mounting surface (block 802). Method includes angularly forming a first half slot antenna along both inner perimeter sides of a first corner of an enclosure (block 804).

In one or more embodiments, in addition to forming the first half slot antenna, method 800 includes forming a slot antenna in a portion of the bezel mounting surface of the frame that is sized for a middle band frequency. The slot antenna has an unclosed end proximate to a gap in the exterior band (block 806). The first half slot antenna has a first portion sized for a low band frequency that is less than the middle band frequency and has another portion that is sized for a high band frequency that is greater than the middle band frequency. The first half slot antenna is configured to have a lossy resonant frequency band in an unused band between the low and high band frequencies (block 808). Forming the first half slot antenna in the enclosure includes forming the first portion for a low band frequency having a narrower aperture size at one shorting end than another portion sized for a high band frequency. Narrowing the aperture size introduces a slot mode that improves a low band voltage standing wave ratio (block 810). Method 800 includes attaching one or more functional components to an interior mounting surface of the enclosure (block 812). Method 800 includes physically coupling and electrically connecting each of the first and second half slot antennas and slot antenna via a respective feed line to at least one of the one or more functional components (block 814). Method 800 includes attaching, to the interior mounting surface of the frame, a user interface device that presents a front exterior surface of a user device (block 816). The automated manufacturing system attaches an exterior band to the perimeter mounting surface to form an enclosure shape having a plurality of corners (block 818). Method 800 includes attaching a nonconductive exterior bezel to the bezel mounting surface of the frame, forming a bezel portion of a back exterior surface and hiding the antenna assembly (block 820). An exterior back panel is attached to the back panel mounting surface of the frame as a portion of a back exterior surface of the enclosure (block 822). In an exemplary embodiment, the exterior back panel is formed of a conductive metal portion that forms at least a portion of the half slot antenna. Then method 800 ends.

In the above-described flow charts, one or more of the method processes may be embodied in a computer readable device containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general purpose computer, special purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A user device comprising:
an enclosure comprising a metal exterior band and an interior mounting surface for receiving one or more functional components; and
an antenna assembly within an open racetrack formed along an inside perimeter of the metal exterior band and having an electrical interface connected to at least one of the one or more functional components, the electrical interface being at least one feed line, the antenna assembly comprising a first half-slot antenna formed as an opening extending along both inner perimeter sides of the metal exterior band at a first corner of the enclosure, the first half-slot antenna having a first portion that terminates in a shorting end and connects at an other end to a second portion that has a wider transverse width than the first portion and extends away from the other end of the first portion and terminates with an unclosed end at a gap in the metal exterior band, the first portion being sized for a low frequency band and the second portion being sized for a high frequency band.

2. The user device of claim 1, wherein the enclosure comprises:

a frame having a front mounting surface at a front side of the user device for receiving a user interface device presented as a front exterior surface of the user device, a back mounting surface at a back side of the user device for receiving a metal exterior back panel, a bezel mounting surface that surrounds a perimeter of the back mounting surface, and a mounting surface at a perimeter of the user device attached to the metal exterior band that encloses respective side edges of the front exterior surface and the bezel mounting surface to form a generally rectangular cuboid shape having a plurality of corners; and wherein the first half-slot antenna is formed in the bezel mounting surface proximate to the metal exterior band.

3. The user device of claim 2, further comprising:

the metal exterior back panel, which forms a conductive metal portion of the half-slot antenna, a bottom edge of the metal exterior back panel being spaced away from a bottom side of the user device by a distance; and a nonconductive exterior bezel attached to the bezel mounting surface of the frame and extending across the distance at the bottom side of the user device to an edge of the metal exterior back panel to form a bezel portion of a back exterior surface that covers the antenna assembly.

4. The user device of claim 2, further comprising:

a printed circuit board (PCB) ground having an end that extends to provide a conductor; and a device interface attached to the frame, wherein the exterior band has the gap that exposes the device interface; and wherein the first half-slot antenna has the unclosed end proximate to the gap in the exterior band, the unclosed end being electrically coupled to the conductor.

5. The user device of claim 2, wherein:

the antenna assembly further comprises a slot antenna formed in a portion of the bezel mounting surface of the frame;

the slot antenna is sized for a middle band frequency; and the slot antenna has an unclosed end proximate to the gap in the exterior band, the unclosed end being physically coupled to and electrically connected to a feed line coming from the one or more functional components.

6. The user device of claim 2, further comprising the metal exterior back panel attached to the mounting surface of the frame as a portion of a back exterior surface of the enclosure, the metal exterior back panel comprising a conductive metal portion that forms at least a portion of the exterior of the first half-slot antenna.

7. The user device of claim 1, wherein:

the first portion of the first half-slot antenna is longitudinally sized for low band frequency;

the second portion of the first half-slot antenna is longitudinally sized for high band frequency; and a transverse width of the first portion is narrower proximate to the shorting end than the wider transverse width of the second portion to introduce a slot mode to the first portion that improves a low band standing wave ratio.

8. The user device of claim 1, wherein the antenna assembly further comprises a second half-slot antenna formed along both inner perimeter sides of a second corner of the bezel mounting surface proximate to the exterior band, the second half slot antenna being a diversity antenna.

9. The user device of claim 1, wherein:

the second portion extends along the bottom of the user device and is longitudinally sized and has a first transverse width for HB frequency; and the first portion extends at an angle from the second portion up along the bottom side of the user device and is longitudinally sized for LB frequency and terminates with the shorting end, the first portion having a narrower transverse width proximate to the shorting end than the first transverse width of the second portion, wherein the narrower transverse width of the first portion introduces a slot mode to the first portion that improves a low band standing wave ratio.

10. The user device of claim 1, wherein the antenna assembly is a part of an antenna system comprising four internal loop antennas arranged in continuous race track shaped region along a perimeter of the user device, with two breaks at a bottom universal serial bus (USB) device interface and a top component, the race track shaped region grounded at selective locations so that an antenna length is suitable for optimum performances, the four internal loop antennas comprising main antennas, including the first half-slot antenna disposed on one of a bottom two corners of the user device and diversity antennas disposed at a top two corners of the user device.

11. The user device of claim 1, further comprising:

a front end that supports diversity ultra-low (ULB), low band (LB), and high band (HB) communication, the front end coupled to the first half-slot antenna via the feed line.

12. A user device comprising:

one or more functional components; and a user device chassis comprising an enclosure having an interior mounting surface for receiving one or more functional components and comprising:

a metal exterior band;

a frame having a front mounting surface at a front side of the user device for receiving a user interface device of the one or more functional components presented as a front exterior surface of the user device, a back mounting surface at a back side of the user device for receiving an exterior back panel, a bezel mounting surface that surrounds a perimeter of the back mounting surface, and a mounting surface at a perimeter of the user device attached to the metal exterior band that encloses respective side edges of the front exterior surface and the bezel mounting surface to form a generally rectangular cuboid shape having a plurality of corners;

an antenna assembly having an electrical interface connected to at least one of the one or more functional components, the electrical interface being a feed line, the antenna assembly comprising a first half-slot antenna formed as an opening extending along both inner perimeter sides of a first corner of the enclosure in the bezel mounting surface proximate to the exterior band, the first half-slot antenna having a first portion that terminates in a shorting end and connects at an other end to a second portion that has a wider transverse width than the first portion and extends away from the other end of the first portion and terminates with an unclosed end at a gap in the metal exterior band, the first portion being sized for a low frequency band and the second portion being sized for a high frequency band; and a nonconductive exterior bezel attached to the bezel mounting surface of the frame, forming a bezel portion of a back exterior surface and hiding the antenna assembly.

13. A method comprising:

forming a first half-slot antenna as an opening extending along both inner perimeter sides of a metal exterior band at a first corner of an enclosure for a mobile user device, the first half-slot antenna having a first portion that terminates in a shorting end and connects at an other end to a second portion that has a wider transverse width than the first portion and extends away from the other end of the first portion and terminates with an unclosed end at a gap in the metal exterior band, the first portion being sized for a low frequency band and the second portion being sized for a high frequency band;

attaching one or more functional components to an interior mounting surface of the enclosure; and electrically connecting the first half-slot antenna to at least one of the one or more functional components to provide signal communication.

14. The method of claim 13, further comprising:

forming a frame of the enclosure having a front interior mounting surface, a back panel mounting surface, a bezel mounting surface that surrounds a perimeter of the back panel mounting surface, and a perimeter mounting surface;

attaching, to the interior mounting surface of the frame, a user interface device that presents a front exterior surface of a user device;

attaching the metal exterior band to the perimeter mounting surface to form a shape having a plurality of corners; and attaching a nonconductive exterior bezel to the bezel mounting surface of the frame, forming a bezel portion of a back exterior surface and hiding the antenna assembly.

15. The method of claim 14, further comprising:

attaching a device interface to the perimeter mounting surface of the frame; and attaching the exterior band comprises aligning the gap in the exterior band that exposes the device interface.

16. The method of claim 15, further comprising:

forming a slot antenna in a portion of the bezel mounting surface of the frame that is sized for a middle band frequency and having an open end proximate to the gap in the exterior band;

wherein the first half-slot antenna has the first portion sized for a low band frequency that is less than the middle band frequency and has another portion that is sized for the high band frequency that is greater than the middle band frequency, the first half-slot antenna having a lossy resonant frequency band in an unused band between the low and high band frequencies; and physically coupling the slot antenna via a next feed line to at least one of the one or more functional components.

17. The method of claim 14, further comprising attaching an exterior back panel to the back panel mounting surface of the frame as a portion of a back exterior surface of the enclosure, wherein the exterior back panel comprises a conductive metal portion that forms at least a portion of the first half-slot antenna.

18. The method of claim 13, wherein forming the first half-slot antenna in the enclosure comprises:

sizing a longitudinal length of the first portion for the low band frequency, the first portion terminating in the shorting end;

sizing a longitudinal length of the second portion of first half slot antenna for the high band frequency; and forming a transverse width of the first portion to have a narrower width proximate to the shorting end than the wider transverse width of the second portion to introduce a slot mode to the first portion that improves a low band standing wave ratio.

19. The method of claim 13, further comprising forming a second half-slot antenna in the enclosure as a diversity antenna along both inner perimeter sides of a second corner of the bezel mounting surface proximate to the exterior band.

20. The method of claim 13, wherein forming the first half-slot antenna comprises forming the first portion for a low band frequency having a narrower aperture size at one shorting end than the second portion sized for a high band frequency.

* * * * *